US006594083B1

(12) United States Patent
Raber (10) Patent No.: US 6,594,083 B1
(45) Date of Patent: Jul. 15, 2003

(54) LENTICULAR IMAGING SYSTEM, METHOD AND APPARATUS

(75) Inventor: Peter E. Raber, North Bellmore, NY (US)

(73) Assignee: Vizta 3D, Inc., Norwalk, CT (US)

( * ) Notice: Subject to any disclaimer, the term of this patent is extended or adjusted under 35 U.S.C. 154(b) by 0 days.

(21) Appl. No.: 09/594,646

(22) Filed: Jun. 15, 2000

Related U.S. Application Data (60) Provisional application No. 60/139,312, filed on Jun. 15, 1999, and provisional application No. 60/187,968, filed on Mar. 9, 2000.

(51) Int. Cl.$^7$ ............................................. G02B 27/10
(52) U.S. Cl. ...................................... 359/619; 359/626
(58) Field of Search .............................. 359/619, 621, 359/622, 625, 626, 630, 631, 633

(56) References Cited

U.S. PATENT DOCUMENTS

| | | | | |
|---|---|---|---|---|
| 4,487,490 A | * | 12/1984 | McKee | 396/330 |
| 5,924,870 A | * | 7/1999 | Brosh et al. | 434/365 |
| 6,147,805 A | * | 11/2000 | Fergason | 359/630 |

* cited by examiner

Primary Examiner—Ricky Mack
(74) Attorney, Agent, or Firm—Amster, Rothstein & Ebenstein

(57) ABSTRACT

A system and method generate lenticular slides or cards which are optimized for optical imaging by compatible optical systems such as lenticular viewers to generate images which may be reimaged without loss of desirable lenticular image properties. Such systems include optics positioned at a predetermined optical distance from such an optimized lenticular component, to reimage a plurality of images from the lenticular component without loss of desirable lenticular image properties. In one embodiment, a lenticular viewer includes an optical element providing a viewing distance of less than about 18 inches from the lenticular component. The lenticular viewer may also incorporate a virtual baffling method to enhance image contrast by eliminating undesirable background reflections. A floating image apparatus incorporates virtual baffle techniques and includes a housing having an aperture, a beamsplitter, and in one embodiment, an optic having a center of curvature, with the optic tilted with the center of curvature being off a line of sight of an observer to cause a reimaged line of sight to fall outside of the aperture, and to cause an image of the center of curvature, reflected by the beamsplitter, to be outside of the extent of an imaged object, thereby causing one side of an image of the aperture to be in the observer's line of sight with the imaged object to serve as a virtual baffle when reimaged by the optic. The housing is capable of being hand-held, and includes the beamsplitter and the optic.

24 Claims, 5 Drawing Sheets

(Lenticular) Object

Lens (or unaided eye)

Image

LENTICULAR IMAGING SYSTEM, METHOD AND APPARATUS

This application claims benefit of Prov. No. 60/139,312 filed Jun. 15, 1999 and claims benefit of Prov. No. 60/187,968 filed Mar. 9, 2000.

BACKGROUND OF THE INVENTION

The present invention relates to imaging and, more particularly, to lenticular imaging systems. A particularly important aspect of the invention relates to optical reimaging of lenticular cards to produce real floating lenticular images without loss of desirable lenticular properties, such as the ability to produce the appearance of multi-frame action or three-dimensional images throughout complete image frames without multi-frame confusion.

Three-dimensional and/or floating image visual effects may be created by known holographic techniques, floating image projectors, handheld stereoscopic slide viewers, slide or movie projectors, and lenticular cards (transmissive or reflective types) for motion and/or three-dimensional (3D) simulation. Lenticular cards in the prior art are designed for unaided viewing and are typically located at arm's length or beyond, at normal viewing distances from the eye. Such prior art lenticulars provide unsatisfactory images when they are projected or otherwise optically reimaged. In particular, ordinary lenticular objects reimaged by ordinary optical systems are severely limited in full-frame image capability, especially in the compact and optically powerful configuration necessary for hand-held floating image projectors.

A need exists for lenticular imaging systems and methods for producing lenticular cards and other products which provide improved images when optically reimaged.

Figure 1:
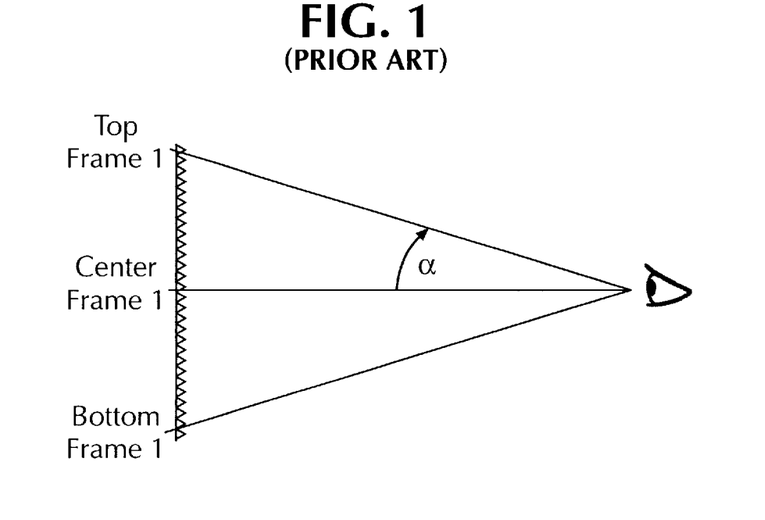
FIG. 1 illustrates a full frame image viewed from a fixed eye position.
Figure 2:
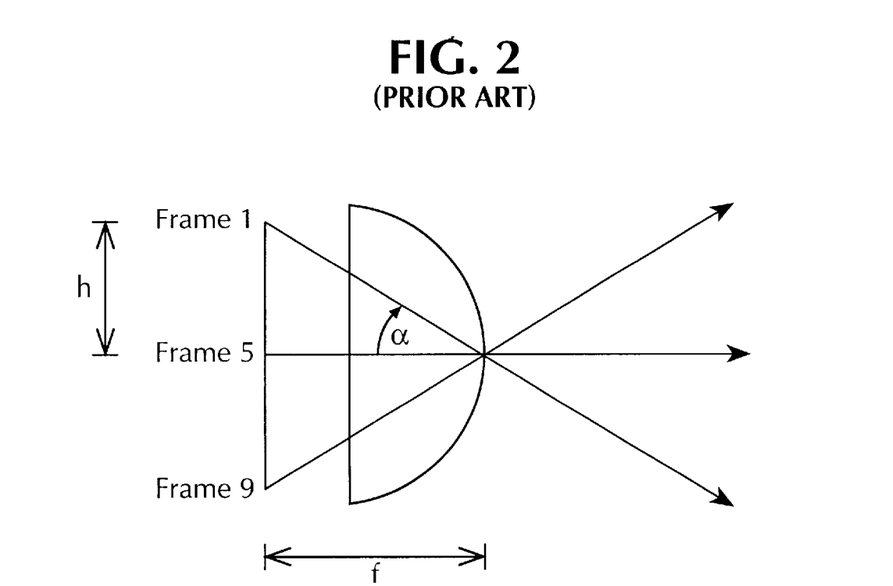
FIG. 2 illustrates an individual lenslet which reimages multiple frames.

Prior art lenticular cards and transparencies are designed for direct viewing. In the most common fabrication process, multiple image frames are selected and collated in the desired viewing order, then lines of data from each in turn are printed in successive strips oriented parallel to the lenticular cylindrical axis. Data strips from (for example) the bottom of each frame are printed behind the bottom cylindrical lenslet, or "lenticule", of the lenticular lens, and this process is iterated for all successive frame sections and lenticules until the appropriate data from all frame regions is printed behind the array of lenticules. This process is known as "interlacing". Each lenticule is associated with the same number of data strips as the number of frames, and each lenslet projects images of each of its associated strips at different angles, as shown in FIGS. 1–2. Equivalent direct imaging fabrication processes are also possible.

The picture elements or "pixels" that make up each image frame consist of the variegated data (e.g., density, color, etc.) printed within each strip parallel to the lenticular cylindrical axis, combined with the independently variegated data printed perpendicular to that axis in the other corresponding strips associated with successive lenticules. With i data strips per lenticule corresponding to i image frames, and with y lenticules covering each data frame and x independent pixels in each data strip, the product xy represents the total number of pixels in each frame, and the product ixy is the total number of pixels printed in the entire ensemble of i frames. Interlacing of the i data strips behind each lenticule follows essentially identical local mapping patterns throughout the lenticular. This results in iy image beams at i different angles for each orthogonal x-location. FIGS. 1 and 2 clarify this prior art.

Referring to the example of FIG. 1, the eye observes the top, center, and bottom of one section of an action-type lenticular in viewing a single frame, utilizing light that exits individual lenslets at different angles, depending on each pixel's location within the frame. Such prior art lenticulars have their data strips interlaced such that an image beam from the strip corresponding to the top of the desired image frame is optically projected (typically but not necessarily at infinite conjugates) by the uppermost lenticule at an angle α to the optical axis (α in FIG. 1) that corresponds to the angle required for the observer's eye to see the top of the desired frame. Similarly, data strips for the center, bottom, and all other regions of that frame are printed at the proper locations behind their associated lenticules such that their image beams are projected at the other angles appropriate for the observer's eye to view those frame regions. As a result, all such image beams for a single frame are projected by the lenticular lens (the ensemble of all parallel lenticules) so that they intersect at the nominal eye location, as shown in FIG. 1. The observer therefore sees only the data from the data strips corresponding to the desired frame; the other data strip images are projected either above or below the eye in this example.

FIG. 2 illustrates a view of one individual lenslet, showing an example of how information corresponding to various frames is printed at each pixel location. Frame 1 data, for example, can be printed at a height h above the local lenticule axis, which relates to the focusing distance f (typically near or equal to the lenticule's focal length), such that h=f tan α. This example could therefore correspond to the topmost lenticule in FIG. 1, projecting the topmost frame data toward the observer at angle α.

Moving the eye or moving/tilting the lenticular then allows successive frame data strip contributions from the various angles to be seen at each frame location. Thus, printing the appropriate multi-frame information within each pixel of the card or transparency produces the desired illusion (e.g., of motion, stereoscopic pairing, other action such as "morphing", or other desired effect) as the observer's viewpoint changes. Note that while the examples of FIGS. 1 and 2 have been discussed in terms of "action-type" lenticulars with nominally horizontal lenticule axes, the principles are equally valid for "3D" type lenticulars, in which the lenticule axes are nominally vertical, and in which selectively paired stereoscopic images are presented to the observer's left and right eyes. ("Top/bottom" references would then be changed to "left/right".)

Prior art lenticulars are optimized for unaided viewing. Thus, subsequent optical reimaging of such lenticulars necessarily alters the angular distribution of rays reaching the eye, with the effect of making truncated portions of several image frames visible simultaneously, thereby resulting in unintended confusion between frames. This typically truncates the effective angular size of a full frame as observed, since only part of each frame can be acceptably reimaged at any given combination of object orientation angle and eye position. Such alteration of angular distribution due to reimaging is qualitatively suggested in FIGS. 3–4, which use a simple lens to represent the possibly reflective and/or complex reimaging optics.

Figure 3:
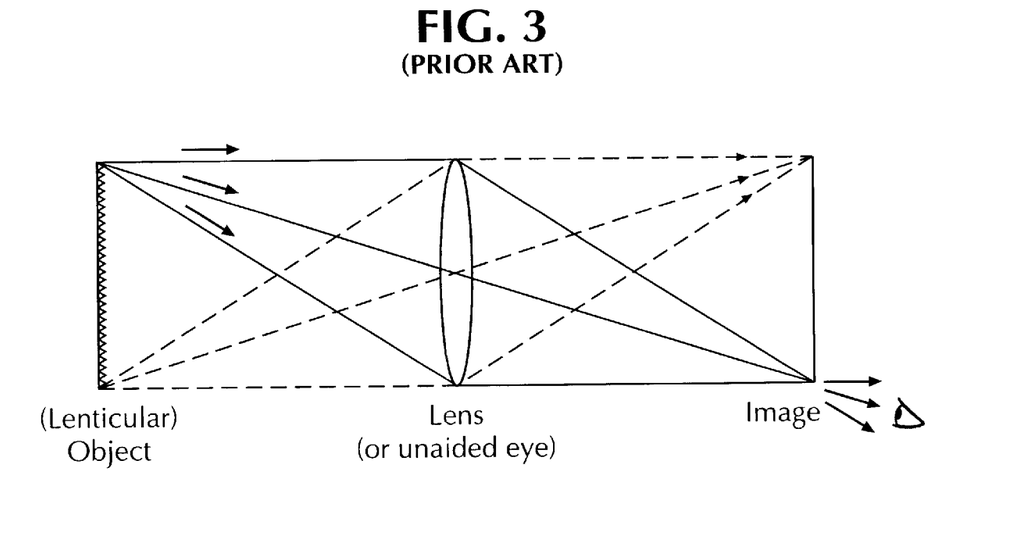
FIG. 3 illustrates viewing field limitations due to image directionality inversion.

With no lens in FIG. 3, an eye at normal viewing distance from the lenticular object could directly view the top, center, and bottom of the frame in the manner of FIG. 1. (Without loss of generality, this eye location may conveniently be taken as that of the central lens in FIG. 3.) However, with the lens in place in FIG. 3, the eye must be located beyond the image (and also below the axis, as illustrated) in order to see the inverted end of the frame image. This is because reimaging by the lens causes the object beam, which is initially directed toward the optical axis, to be converted to the image beam, which is directed away from the axis. Note that the eye location shown is outside the viewing angle for rays from the opposite end of the frame, and that in fact, any eye location beyond the image necessarily precludes the observer from viewing the entire image simultaneously, because of similar viewing angle limitations. These are fundamental limitations on viewable frame size in directly viewed real images that can only be overcome when the lens is larger than the image, for example, as in FIG. 4.

Figure 4:
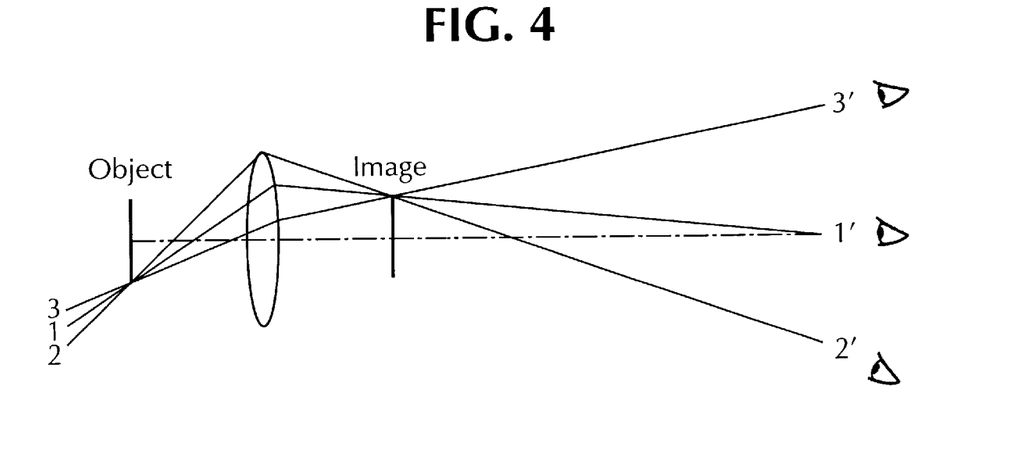
FIG. 4 illustrates viewing of one edge of a reimaged frame from various eye locations, with information from different data strips seen at the same frame location.

As illustrated in FIG. 4, the eye can view the entire image from any of the eye locations shown (and from anywhere between them), because all rays between any eye location and any point on the image can be extended to intersect the optic, and can therefore be produced by the optic. Note that the perception of the same image point from different eye locations, as in location 1', 2', and 3' on the right side of FIG. 4, utilizes different regions of the reimaging lens as well as significantly different emitting angles from the object. (For example, the angle between object ray 1 and the lens in FIGS. 4 is clearly much larger than that between the lens and corresponding image ray 1'.) It is clear from FIGS. 3 and 4 that prior-art lenticulars optimized for normal viewing distances cannot be properly reimaged by simple optical means (e.g., ordinary lenses, mirrors, etc.), because such reimaging introduces angular mapping changes that cause data from undesired frames to replace some of the desired data in the image. As a result, the observer is presented with multiple image frame bands that are each angularly truncated in the direction normal to the lenticular axis, resulting in multi-frame confusion.

Ordinary lenticular cards or transparencies are designed for images that are interlaced for normal viewing, with output beams projected at or near infinite conjugates. This is quite adequate for relatively long normal viewing distances beyond a foot or two because of the extremely short focal length of the lenticules (such as focal lengths typically well below 1 mm). However, inherent in the interlacing process, but never before recognized or exploited in the prior art, is the capability of drastically modifying the process to optimize the lenticular for optically-reimaged viewing.

Such modification is an object of the present invention. A need exists to optimize lenticulars for optical reimaging by modifying the interlacing process in a manner that preserves desired lenticular properties in the image. Another object of the invention is to incorporate desirable 3D or floating image properties, (e.g., similar to those provided by known volumetric display technology), in a hand-held or otherwise portable viewer. A further object is to incorporate real and virtual baffling techniques that are of particular value in optimizing image contrast in such viewers or in floating image projectors of any size. The preferred embodiments of the lenticular and the viewer incorporate these and other features, as the following description reveals.

SUMMARY OF THE INVENTION

A system and method are disclosed for generating lenticulars optimized for optical reimaging by compatible lenticular viewers or other optical instrumentation. The resulting images may then be reimaged without the truncation and multi-frame confusion inherent in the optical reimaging of prior-art lenticulars, thereby preserving desirable lenticular properties in the observed image. The lenticular viewer includes one or more optical elements positioned at predetermined optical distances from the specially-designed lenticular element, such that each one of the images from the lenticular element is reimaged in its intended full frame. In one embodiment, the lenticular viewer includes optics providing a viewing distance of less than about 18 inches from the lenticular element, which is particularly suitable for hand-held applications. The lenticular viewer may also be designed with the incorporation of a virtual baffling method which is also disclosed as part of this invention. This feature helps provide superior image contrast in many uncontrolled types of ambient illumination environments that might be encountered when using a hand-held viewer.

By modifying standard lenticular generation techniques known in the art, the disclosed system and method generate lenticular objects which are especially suitable for subsequent optical imaging, either as virtual images or as real screen-borne or directly viewed "floating" images. For such floating images, lenticulars may be used with known volumetric display technology to produce especially impressive real, floating, animated or autostereoscopic lenticular images.

The modified lenticulars may include minor focusing alterations to change their projected beam conjugates. However, it is of even greater (in fact, crucial) importance to significantly alter the mapping of the data strips, to match the lenticular-projected angles with the desired optical reimaging angles.

For example, in FIG. 4, the different object and image angles make it possible to print different temporal views at each point 1, 2, and 3 on the object, corresponding to the pixels intended to be reimaged at image angles and locations 1', 2', and 3' respectively. The concept is the same as that illustrated by FIG. 2, but with the printed regions corresponding to the object angles for the reimaging of FIG. 4 rather than for the unaided viewing of FIG. 2.

These modifications to the lenticular design are more fully discussed in the detailed description of the preferred embodiment.

Note that by using commercially available components such as those specified in Table 1, a reasonable proof-of-principle design of specially-configured lenticulars and viewers implementing the lenticular-reimaging aspects of the disclosed system and method may be constructed.

TABLE 1

| Manufacturer | Product Number | $R_c$ | $\phi$ | Type |
|---|---|---|---|---|
| Edmund | F42970 | 5.984 in. | 2.087 in. × 4.231 in. | Front-surface Al mirror |
| Melles-Griot | 01MCG027 | 5.394 in. | 5.5118 in. | Front-surface Al mirror |
| Melles-Griot | 02MCG025 | 3.150 in. | 3.937 in. | Front-surface Al mirror |
| Rolyn | 61.2400 | 3.150 in. | 3.937 in. | Front-surface Al mirror |
| Rolyn | 61.2825 | 3.937 in. | 3.937 in. | Rear-surface Al mirror |
| Rolyn | 61.2850 | 5.906 in. | 5.906 in. | Rear-surface Al mirror |

Using, for example, the Rolyn 61.2825, a typical short projection of about 1.5 inches with a real-thickness beamsplitter is attained, providing an excellent vertical viewing angle of greater than about 48° for small objects, with acceptable resolution. Of course, the preferred embodiment specified herein demonstrates the invention in a superior manner, with both a larger image and the incorporation of other disclosed viewer features such as the FIG. 10 off-axis background-suppression approach.

DETAILED DESCRIPTION OF THE PREFERRED EMBODIMENT

Figure 5:
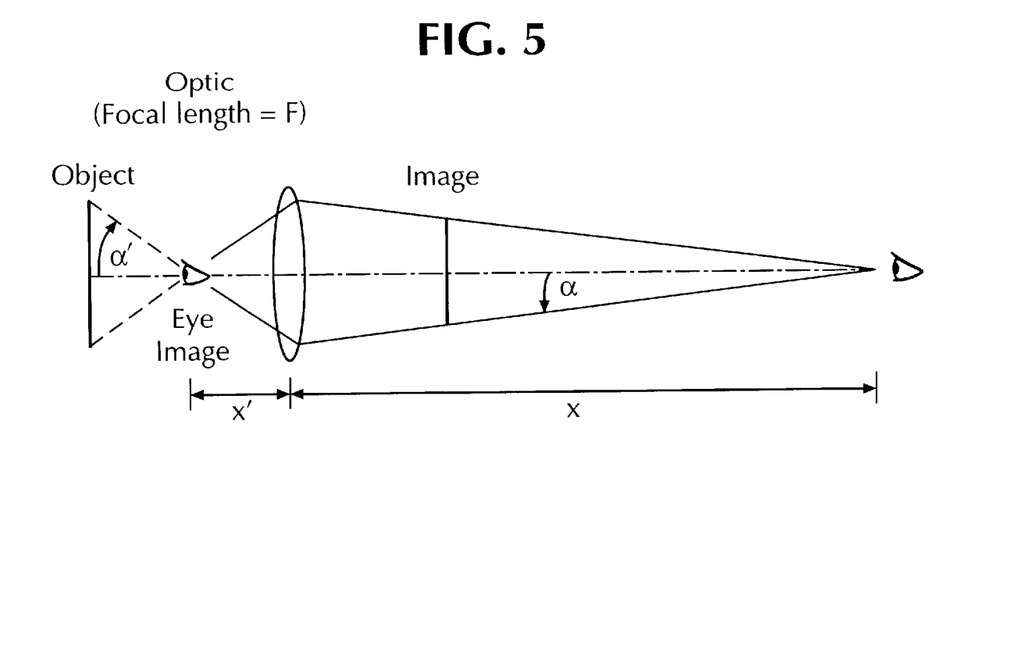
FIG. 5 illustrates full-frame optimization of a reimaged "action" or "variable-scene" lenticular object with nominally horizontal lenticule axes.

Referring now to FIG. 5, a system and method are disclosed for generating lenticulars intended for reimaging, which optimize the resulting images. In addition, design approaches for viewers incorporating and using such reimaging lenticulars are also described, and a "virtual baffling" design technique, unknown in prior art, that is of particular value in such viewers is disclosed. The disclosed system and method implement the recognition that such optimizations are necessary and possible for optimum reimaging.

Proper lenticular optimization is attained by altering the interlacing within the printed card or transparency so that it is designed for full frame "viewing" by the image of the eye formed by the reimaging optics, rather than by the eye itself, as shown in FIG. 5. The viewing angles corresponding to a full frame are significantly different for the eye than for its image, as FIGS. 3, 4, and 5 all clearly show. Because of these unequal angles, therefore, a lenticular object printed for direct viewing is incompatible with optical reimaging, and one designed for reimaging is incompatible with direct viewing. Such incompatibility need not completely scramble the image, but it can manifest itself as a loss of usable frame size and/or confusion among multiple frames in the viewing field.

Figure 6:
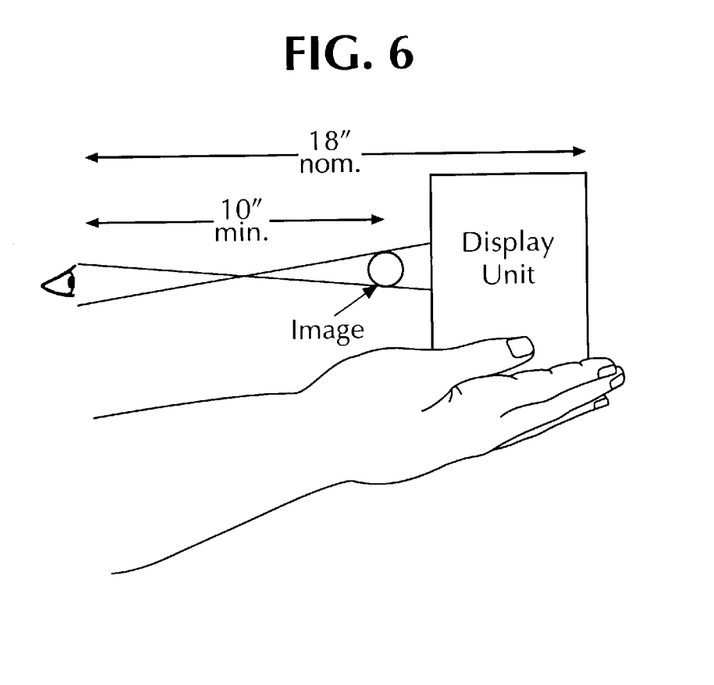
FIG. 6 illustrates the use of an example hand-held viewer incorporating the disclosed optimization.

In the preferred embodiment, the disclosed system and method are used to generate a lenticular as the object in FIG. 5 for use in a lenticular viewer as shown in FIG. 6, by interlacing the data strips to correspond to the object angles on the lenticular side of the optic, rather than to the image angles on the observer's side. The optic in the viewer (here shown as a simple lens) then causes these beams to be redirected such that they intersect at the observer's eye in the desired manner. By comparing the eye and the image in FIG. 5 to the eye and lenticular in FIG. 1, it may be seen that this method produces the desired full-frame image as previously described. Furthermore, as FIG. 5 suggests, this method is essentially equivalent to designing the lenticular with interlacing optimized for the image of the observer's eye as formed by the optic, rather than for the eye itself as in prior art. For convenience in presenting the concept, this description ignores optical aberrations. However, in many cases such aberrations are small and/or irrelevant, and in those cases where they should be accounted for, further interlacing compensation based on exact ray tracing through the optical system is readily feasible.

Similarly, since optical reimaging typically also changes the numerical aperture of the reimaged beams from each lenticule, the focusing distance f in FIG. 2 may also be modified in compensation. This type of compensation is typically not particularly critical for image resolution or frame truncation considerations, but it can affect apparent image brightness and contrast. These factors directly impact the illumination system design and the available "dark level" in the image. Therefore, for optimum image impact, focusing distance f should be designed to compensate for the reimaging, to the degree feasible. (For example, f could be chosen shorter than the lenticular focal length for a viewer that projects a real floating image, in order to send a diverging input beam to the optic.)

The preferred embodiment of the viewer, shown as the display unit in FIG. 6, is designed with the observer's eye positioned, for example, about 17 inches from the optic, which in this example is a mirror having a radius of about 5.5 inches. The corresponding FIG. 5 "eye image" location is about 2.22 inches from the lenticular object. The preferred embodiment of the lenticular in this system was therefore designed for that distance rather than for normal viewing distances, in accordance with the method of this disclosed invention. Note that 2.22 inches is much too close for ordinary viewing without optical aid; most applications require a minimum viewing distance of 10 inches for acceptable eye accommodation.

The hand-held multi-purpose floating image viewer shown in FIG. 6 may be optimized for lenticular transparencies, although it is also usable for ordinary slides and thin-base prints, photographs, etc. For example, in the embodiment of the invention reduced to practice, the lenticulars (made from existing footage) included interlacing for 2.22 in. viewing distance instead of typical viewing at larger distances. The resulting floating lenticular action images were highly successful, reproducing the full-frame lenticular action exactly as intended. Moreover, the same viewer was then demonstrated to be equally capable of producing floating images from ordinary transparencies and printed images.

3D lenticulars can also be designed for optical projection by properly interlacing vertical strips of stereo information in the manner previously described. This is equivalent to interlacing ordinary 3D information strips intended for normal viewing distances as if they were to be viewed by the two eye images shown in FIG. 7.

Figure 7:
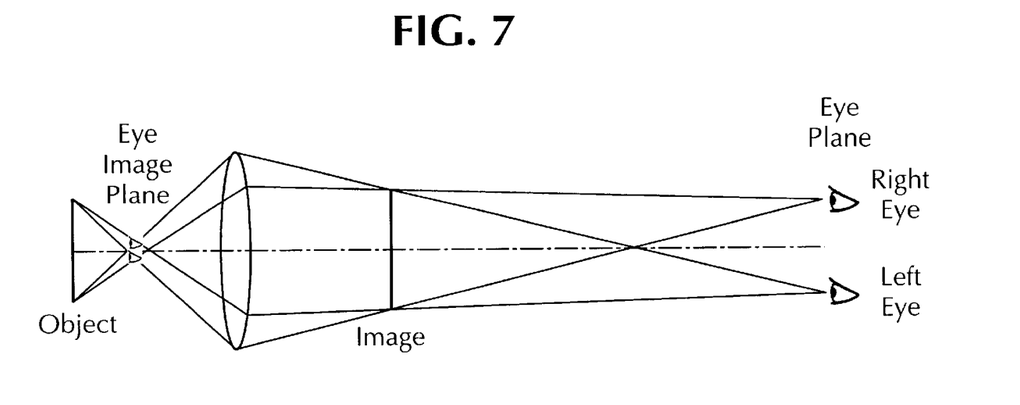
FIG. 7 illustrates full-frame optimization of a reimaged "3D" or "stereo" lenticular object with nominally vertical lenticule axes.

FIG. 7 illustrates interlacing for stereo images perceived by both eyes, in, which each point on the image is viewed by each of the eyes at a different aspect angle. Just as in the single-eye illustration of FIG. 5, these angles are significantly different for the actual eyes viewing the image than they are for the eye images "viewing" the actual object. The latter object-side "viewing" angles, for the object as seen by each of the eye images, define the required interlacing conditions for each strip of optical information. As FIG. 7 shows, the viewer optics then transform the angles on the object side to new angles on the image side such that the information presented at each viewing angle is the same as that for viewing standard prior-art 3D lenticulars placed at the image location in FIG. 7.

As discussed, the preferred embodiment viewer has a reflective optic of 5.5 in. radius and a 17 in. observer-optic separation. At 1×imaging, this corresponds to about 11.5 in. between the eye plane and the image, and a paraxial reduction ratio of 5.182 between the actual eye plane and the eye-image plane. This places the eye-image plane at a distance of 3.28 inches from the optic, which is equivalent to 2.22 in. between the eye-image plane and the object. For actual 2.5 in. eye separation, the eye images under these conditions are about 0.48 in. apart.

Qualitatively, these figures describe how lenticulars designed in accordance with this invention should be interlaced for reimaging in this hand-held viewer. As a quantitative example, with these viewer parameters applied to FIG. 5, the image paraxially subtends an angle of ±4.97° at the eye, while the actual object subtends ±24.25° at the eye image. Referring to FIG. 1, full-frame viewing of the reimaged lenticular would therefore require the frame 1 data strip at the top of the frame to be printed at a height h=f tan 24.25° above the uppermost lenticule axis, where f is the lenticule focal length. (See FIG. 2 for details.) This would then provide the desired 4.97° image angle in FIG. 5. Throughout frame 1, the appropriate paraxial mapping for the location of each data strip from center to edge would be h=(n/N) f tan 24.25°, where h is the height of the frame 1 data line above the axis of the $n^{th}$ lenticule, n=0 for the central lenticule, and n=N for the uppermost lenticule. For data strips below the axis, of course, the same equation holds in a negative sense. Similarly, the same principle with appropriate displacements holds for the other frames, and for 3D/stereo lenticulars (FIG. 7) with the top and bottom edges replaced by left and right edges.

More generally, this mapping equation may be written h=(n/N) f tan α', where α' is the extreme object half-angle shown in FIG. 5. The relationship between α' and a (the corresponding image angle presented to the observer) depends on the desired optical reimaging for which the lenticular is designed. For example, assuming a desired observer eye distance x from the projection optic whose focal length is F, the paraxial eye-image distance from the other side of the optic is x'=Fx/(x−F). While the actual distance of the lenticular object from the optic may vary depending on the exact reimaging characteristics intended, the object angle α may be determined from the desired image angle α by using the paraxial equation x tan α=x' tan α'. Thus, the more general mapping equation for full-frame imaging when the frame is normal to the optical axis as in FIG. 5 may be written:

$$h=(n/N)(f/F)(x-F)\tan\alpha$$

As previously noted, for even better imaging, exact quantitative figures may be derived from ray traces, which include aberration and any decentering effects in the actual system. These more exact figures may be used in place of the preceding paraxial estimates to define the optimum paraxial mapping equations and consequent interlacing. However, the simpler approach is typically quite adequate, as it was in the demonstration model reduced to practice.

In one application, the disclosed system and method generate lenticulars for use in hand-held viewers, such as compact hand-held units as shown in FIG. 6, configured to be held in the hand of the user, and projecting a small floating image up to or about 2 in. square. Picture cards, transparencies, and holograms had initially been envisioned for the object in such a viewer. However, lenticular transparencies were later identified as the most desirable objects because of their action-simulating capabilities and their freedom from chromatic and other limitations of holograms. The size of the viewer is constrained primarily by the requirement for hand-held viewing by a single observer, especially since the target consumers are children.

The extremely short viewing distance is an important parameter. Although the eye accommodation of children is considerably more flexible than that of adults, a minimum distance of 10 in. between eye and image is preferred, and a nominal eye-to-hand distance of 18 in. during use is reasonable. This constrains the maximum usable image size and projection distance, based on the limited distance between the hand and the eye of the observer, as suggested in FIG. 6.

Note that too long a projection distance is unacceptable because of limited arm length, while large images would limit viewing angles too severely to allow lenticular sources to be considered, since they must be actively tilted experience the full lenticular capability; e.g., to simulate action.

Figure 8:
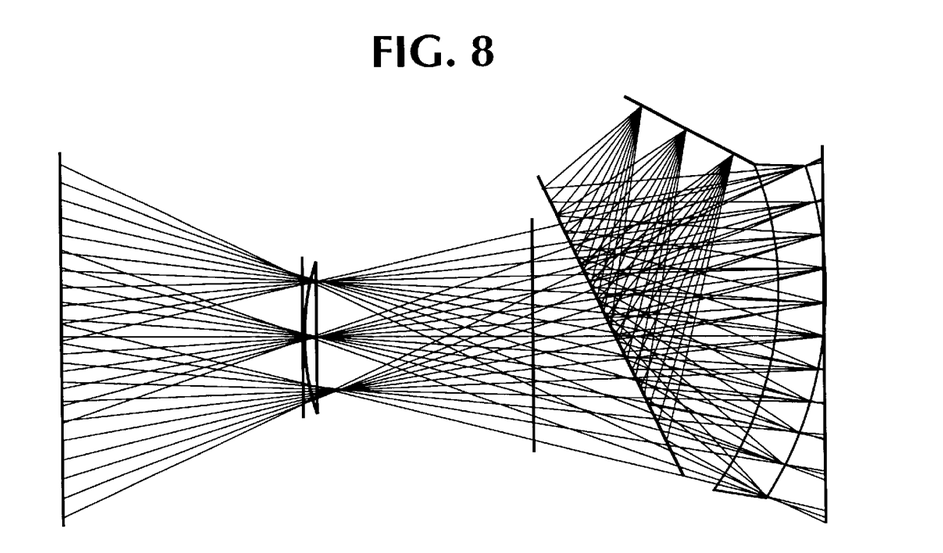
FIG. 8 illustrates typical optical ray traces of a reflective embodiment of the disclosed viewer.

FIG. 8 illustrates optical ray traces of a typical preferred-embodiment viewer of the FIG. 6 hand-held type, using an optically dense beam splitter and concave mirror. Such a design can provide several inches projection of an image with about 30° vertical viewing angle, depending on image height.

In implementation, a hand-held unit as in FIG. 6 is provided for displaying a lenticular image greater than about 2 in. high to one or more observers, which can fit into a package approximately 4 in. by 5 in. by 7 in., including a light source and batteries. With sufficient neutral density included in the beamsplitter, a separate aperture window is unnecessary. Stray light must be controlled, and suitable baffling must be included, preferably including dark interior surfaces and the virtual baffling technique of FIG. 10, described later, for best results.

In other applications, the printed interlaced portion of the lenticular cards may be separated from the corresponding lenticular lens, thereby allowing the lenticular lens to be designed as an inherent part of the viewer, rather than of the card. In this approach, the lenticular lens is properly located and aligned within the viewer at the time of manufacture, and the viewer would include an appropriate aligning mechanism for aligning the cards to that lens. Such aligning mechanisms may employ a transparent or diffusely translucent pressure plate combined with one or more of may well-known techniques, including but not limited to the use of spring-loaded detents in the viewer and alignment notches on the cards.

This approach may offer a number of advantages, including but not limited to: lowering net production cost of for each card in exchange for a slight increase in the cost of the viewer; permitting relative indecipherability of the printed image without its lenticular lens, thereby concealing certain critical features except when the card is inserted into the viewer; providing potential applications in which the exposure of such concealed images or features is integral to heightened interactivity, game play, and/or trading value.

It is also possible to design a variety of lenticular lenses that may be interchangeable within the viewer. This enables the production of a multiplicity of different series of lenticular-matched cards, all viewable within the same viewer, in which each series is associated with its own lenticular lens. These series could be distinguished by their intended application as either "action" or "3D" type, as well as by various other characteristics such as their matching lenticular lens pitch and/or thickness, with consequent impact on perceived image resolution, number of animation frames (or 3D planes), and/or card production method (which affects card price).

The interchangeable lenticular lens approach preserves the ability of the viewer to accommodate a large variety of image sources. These include not only the various types of lenticular-matched cards, but also 3D video display as well as standard video, thinly-backed photos, transparencies, and other sources by replacing the lenticular lens with a simple window or even removing it completely.

A real-time 3D video embodiment of the disclosed invention would use a video source that includes additional interlacing according to the disclosed invention in its video processing, to match an associated lenticular lens with nominally vertical lenticule axes in the manner of FIG. 7. This application might best be realized with vertical (rather than the usual horizontal) scanning in CRTs or equivalent video sources. Note that even with standard interlacing techniques, such lenticular 3D video could be feasible. The inclusion of the disclosed interlacing for optical reimaging allows such technology to be applied to large-screen projection TV as well.

Figure 10:
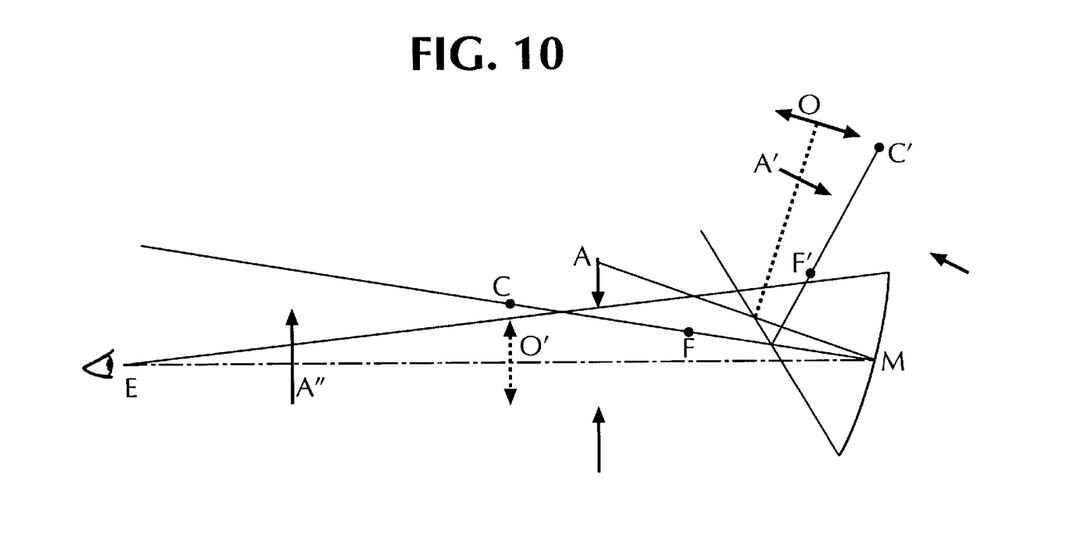
FIG. 10 illustrates "off-axis" separated object and aperture images.

In another embodiment of the disclosed invention, the system and method include off-axis aspects of the viewer design in which the images of the object and of the aperture are separated from each other sufficiently to exclude the aperture image from the observer's line of sight, as illustrated in FIG. 10 and discussed in greater detail in the following section of this description. This eliminates self-imaging of the observer's face and enables proper baffling to be installed around the aperture such that background reflections by the optic are suppressed. The resulting image contrast enhancement is quite valuable for hand-held viewers, which may be used in a wide variety of ambient background illumination conditions.

In another embodiment, a rear-projection diffusing source of moderate gain, such as a gain of about 2, is placed between source and object to further direct the light into the imaging mirror aperture. If gain is too low, light may be diffused too much and will not only be wasted but the background light will increase. If gain is too high, the projection mirror will not be uniformly filled and an original light source image glow will be seen. A second diffuser slightly separated from the first can minimize the latter effect.

Another embodiment may employ a separate background source behind the reflective optic, which should then be only partially rather than fully reflective.

Off-Axis Aspects and Configurations

Since the viewer is intended for lenticular reimaging, which requires that the image be tilted throughout the operating angle, and since it is envisioned for use in normal or even moderately high ambient illumination conditions, it is particularly important to suppress background reflections throughout the relatively large available viewing angle. A number of design techniques may be brought to bear on this objective. These include not only ordinary prior art optical engineering tools such as antireflection coating and stray light baffles, but also a highly effective method of "virtual baffling" disclosed herein. This technique combines off-axis imaging of the object with off-axis imaging of the aperture in a manner that separates the two images. The observer thereby sees the object image clearly, unencumbered by images of the background reimaged through the aperture elsewhere along the same line of sight. This is important, especially in portable hand-held systems that might be used anywhere, because in high-illumination environments the optic can otherwise create an image of the background that can be bright enough to compete with or even overwhelm the desired floating image of the object.

The disclosed system and method may therefore include this virtual baffling technique, comprising off-axis aspects of the viewer design in which the images of the object and of the aperture are separated from each other sufficiently to exclude the aperture image from the observer's line of sight. In employing this design technique, a judicious balance is struck between the degree of virtual baffling desired, and the distortion and other optical aberrations thereby induced in the image. This balance is typically most important in determining image size and viewing angle design tradeoffs.

Figure 9:
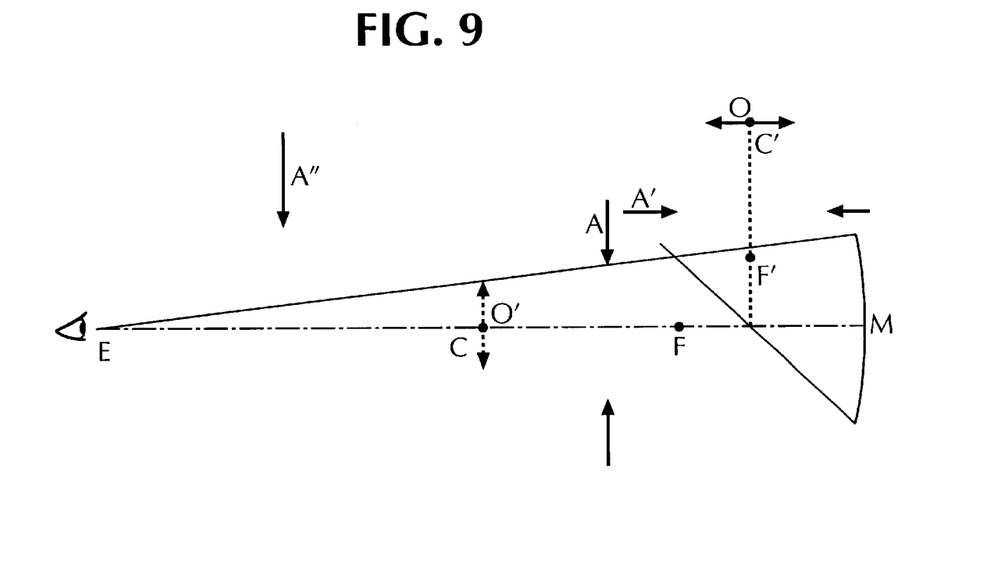
FIG. 9 illustrates "on-axis" collinear object and aperture images.

FIG. 9 illustrates an on-axis reflective design in which the beamsplitter forms an aperture image A' of aperture A. The optic reimages this into aperture image A" in the same line-of-sight as the object image O' of the object O. Since the optic's center of curvature C is on the line of sight, inverted real images of the observer and the background are also created on the same line between O' and the optic's focus point F.

FIG. 10 illustrates the virtual baffling technique, in which the optic is tilted so that C is off the observer's line of sight far enough that the reimaged line of sight falls outside aperture A, and the image C' of C (reflected by the beamsplitter) is outside the extent of the object O. One side of the aperture image A' then obscures the object, thereby serving as a virtual baffle A" when re-imaged by the optic.

With the reflective optic in the preferred embodiment, neither the actual center of curvature of the optic surface nor its beamsplitter-reflected image is included within the object region. Furthermore, the location of the aperture image as reflected by the beamsplitter is separated from the object region, and should preferably be on the opposite side of the optic's center of curvature or its image. (The analogue for refractive optics would require that the aperture and object images be on opposite sides of the optical axis.) These design constraints satisfy the disclosed invention's off-axis contrast enhancement and background-suppression conditions illustrated in FIG. 10.

Hybrid designs with only partial baffling of this type are also feasible when background illumination is low and/or when the beamsplitter includes sufficient optical density to reduce the brightness of reflected background images to a small fraction of that of the main image. Direct background reflections by the beamsplitter should also be reduced, such as by reflection-reducing coating, or baffled out, to the extent that they fall within the usable viewing angle.

As described and shown in FIGS. 9–10, the apertures have been shown slightly beyond the optical focal point, but those skilled in the art will recognize that other distances are equally valid and that no generality is lost by this depiction. Element A' should preferably be magnified rather than reduced, but it may be either real or virtual. The critical feature is that the open region of the aperture A should be reimaged completely off the line of sight, and preferably far enough off so that its image is completely separated from the full extent of the object image O'. The material surrounding the open region of A is thereby re-imaged as a barrier, being the "virtual baffle", which serves as a dark background for image O'. This technique significantly enhances the contrast of the image, which might otherwise be seen against a relatively bright background image. For best results, the inner surface of this material should usually be made matte black, so that it reflects very little light.

Aperture size A increases when large image sizes are desired, as does object size O for near-unity magnification.

In such cases, the aperture and beamsplitter should be moved further apart, and/or the primary mirror tilt angle should be increased, so that A' is adequately separated from O. This tends to force A to the real-image side of F, so that A" becomes a real image in space of virtual image A'. Nevertheless, since the image of the barrier material surrounding A may even be located behind the observer (e.g. if A is sufficiently close to F), and since it is in any event formed from virtual image A', it is appropriate to refer to it as a "virtual baffle".

As an example of this design approach, the preferred configuration of the hand-held viewer includes an overhanging "hood" above the beamsplitter specifically to serve as an extended virtual baffle. This hood extends more than halfway between the beamsplitter and image O', and it defines the upper limit of aperture A.

In addition to virtual baffle considerations, direct background reflections from the beamsplitter must be suppressed in moderate-to-high ambient illumination conditions. Ordinary prior-art techniques such as antireflection coatings on the beamsplitter are helpful for this purpose. However, since the beamsplitter in the lenticular viewer could reflect relatively bright background images (e.g., white clothes) into the observer's eye, and since the viewer is intended to be tilted back and forth in use (potentially allowing the observer to see a reflection of his own face), baffling of the beamsplitter itself is also desirable.

Accordingly, the preferred configuration of the hand-held viewer includes an adjustable lower hinged door to baffle out such images. When open, it can be brought to the optimum orientation to provide such baffling without interfering with the image O' through the full operating tilt angle of the unit. In its closed position, it serves as a beamsplitter cover.

In some configurations, another advantage of this lower baffle is that it can hold another card, or a video source if desired, whose virtual image can be reflected by the beamsplitter toward the observer, creating a background image behind the projected real floating image. This enhances the latter's impact by providing the observer with a parallax reference as the unit is tilted. For best results, unless this background image source is self-luminous, a separately-controllable light source should be provided for it.

The configurations discussed are only examples of numerous possible arrangements, including alternate optical folding layouts, refractive designs, and virtual imaging-systems. Furthermore, the background image suppression principles explained herein are equally applicable to and valuable for floating image displays of any size, whether or not they are designed for or used with lenticulars. Consequently, this disclosure is intended to apply to all image displays, and to floating image displays in particular, regardless of size, source type, or optical component type or arrangement.

The system is implemented in a hand-held lenticular viewer, including specially-manufactured lenticular objects designed as described herein. Outside the viewer, these lenticulars exhibit the undesirable multi-frame and truncation characteristics prior art lenticulars would exhibit when optically reimaged. However, when the lenticulars made according to this invention are placed in the viewer, their resulting full-frame images are properly seen, and the lenticular images exhibit the full expected range of animated motion without frame truncation or multi-frame confusion.

Thus, the system and method may be used in a hand-held unit displaying a lenticular image about 2 inches by 2 inches, which demonstrates the practicality and power of the innovative lenticular design approach described herein. The resulting images display the full range of desired lenticular animation without displaying the frame truncation and other limitations that would result from using ordinary lenticular object in the same optical system. The improvement over the prior art is that prior art lenticular objects reimaged by optical systems are severely limited in full-frame image capability, especially in the compact and optically powerful configurations necessary for hand-held floating image projectors.

The principles herein are not limited to hand-held lenticular viewers, but may be applied to lenticulars used in larger units, such as tabletop units, holographic or other objects, and in magnifiers or projectors of all types including those designed for projecting slides on a screen. In simple units, the lenticular animation may be achieved by continuously tilting the entire unit with respect to the observer. Larger or more complex units may incorporate motion in the unit itself, such as a mechanism for tilting the object, the beamsplitter, or the optic.

The disclosed system and method describe design techniques for a hand-held or other viewer that can provide images of lenticular and/or non-lenticular sources. Such other sources are not limited to those mentioned, and may also include, but are not limited to, holograms, computer-generated images, film or other animated sources, and even real objects. Similarly, the lenticular design method for optical reimaging (real or virtual) is not limited to lenticulars used in a viewer or projector (hand-held or other), and is not limited to toys or similar commercial products, but has application to many other fields. These include, but are not limited to, displays, "real-time" 3D television (e.g., with electronic interlacing optimized for a lenticular lens associated with the viewing screen), and optical instruments of all types.

In general, the viewer and/or the lenticular design method have a wide range of applications, some of which do not yet exist but will develop as a result of this invention. Such applications include, but are not limited to, homemade lenticulars, personalized photos and/or other content, and 3D/floating image interaction for Internet, video telephone, and other telecommunications applications on both the transmitting and receiving side.

The disclosed viewer is also suitable for projecting floating images of self-luminous video source such as a CRT, LCD or plasma panel. The particular application using lenticular cards as the objects to be reimaged does not preclude other applications using the same viewer, with or without the illumination attachment, which may be removable. A lower-cost unit without the illumination attachment is also feasible for lenticulars and even for ordinary slides or other pictures.

The disclosed systems and methods are suitable for use with optical projectors, cameras, or viewing aids of any kind, including simple or complex magnifiers and image relay lenses or mirrors. For example, lenticular cards may be generated which provide the appearance of motion and/or multiple images in succession, with or without the further inclusion of 3D perspective, by modifying the observer's viewpoint with respect to the card. This is most often achieved by tilting or moving the card. No optical modification to the imaging instrument itself is required, although a tilting or lateral motion mechanism for the lenticular card itself may be incorporated in instruments larger than hand-held units, to achieve the desired viewpoint variation with seated or otherwise stationary observers.

The hand-held projector for floating lenticular images is also suitable for projecting floating images of normal slides or other transparencies, as well as thinly-backed paper images, photos, etc. without further modification. The particular application using lenticular cards as the objects to be reimaged does not preclude other applications using the same viewer.

The special method of designing lenticulars for use in many different types of optical systems, including but not limited to such a viewer, is also included in the present invention. In particular, while the foregoing description and disclosure have been presented primarily in the context of a viewer that produces a real floating image, the system and method are equally applicable to viewers or other optical instruments that produce virtual images. Such applications also fall within the scope of this invention.

By the foregoing, the disclosed lenticular generation system and method and the viewer design system and method incorporating off-axis virtual baffling have been disclosed by way of the preferred embodiment. However, numerous modifications and substitutions may be had without departing from the spirit of the invention. Accordingly, the invention has been described by way of illustration rather than limitation.

What is claimed is:

1. A method of generating a lenticular object that incorporates image data strips intended to be imaged by a lenticular lens having an array of cylindrical lenslets called lenticules, all of whose cylindrical axes are substantially parallel to the long axis of said data strips, to enhance their suitability for reimaging by an optical system, comprising the step of:

controlling the positioning of data strip interlacing patterns on said lenticular object to conform to patterns that produce full-frame lenticular images when viewing the image of said object formed by said optical system.

2. The method of claim 1, in which said patterns are interlaced substantially according to the equation $h=(n/N)(f/F)(x-F)\tan(\alpha)$ wherein h represents the distance of a data strip that is substantially parallel to the cylindrical axes from the axis of the $n^{th}$ lenticule of a total of N lenticules measured from the central lenticular lens axis, in which the focusing distance of said lenticule from said data strip is f, and wherein said data strip corresponds to that portion of the frame data intended to be converged at angle $\alpha$ toward a point at distance x from said optical system of focal length F after said reimaging by said optical system, and wherein the angle $\alpha$ is measured between the image of said central lenticular lens axis as formed by said optical system, and a line joining said point at the distance x on said image of said axis to the location of the image of said data strip within said image of said object formed by said optical system.

3. The method of claim 1, in which said patterns are interlaced substantially in accordance with raytraces through said optical system that relate the height of each data strip in said lenticular objects to the angle at which the image of said data strip is required to be reimaged by said optical system in order to produce said full-frame lenticular images.

4. The method of claim 2, in which said portion converged at angle $\alpha$ is viewed by an observer substantially located at said distance x.

5. The method of claim 1, in which said patterns are produced by computer-aided data printing means.

6. The method of claim 5, in which said means include lithographic techniques.

7. The method of claim 1, in which said patterns are produced by optical exposure means.

8. The method of claim 7, in which said means utilize photographic techniques.

9. The method of claim 1, in which said patterns are produced by at least one photographic exposure through said optical system and lenticular lens.

10. The method of claim 1, wherein said optical system includes a beamsplitter.

11. The method of claim 1, wherein said optical system is reflective.

12. The method of claim 1, wherein said optical system is refractive.

13. A system for optically reimaging lenticular objects in a manner that preserves full-frame lenticular image properties, comprising:

an optical system for reimaging said lenticular objects at a set of predetermined optical conjugates, a lenticular object formed by controlling the positioning of data strip interlacing patterns on said lenticular objects to conform to patterns that produce full-frame lenticular images in the image of said object formed by said optical system, and means for locating said object with respect to said optical system that reproduces said set of predetermined optical conjugates.

14. The system of claim 13, in which the image produced by said reimaging is a virtual image.

15. The system of claim 13, in which the image produced by said reimaging is a real image projected onto a screen.

16. The system according to claim 13, in which said housing includes the image source and the optical assembly and is portable.

17. The system according to claim 16, in which said housing is hand-held.

18. The system according to claim 17, in which said image is viewable at normal viewing distances exceeding about 10 inches.

19. The system of claim 13, wherein said optical system includes a beamsplitter.

20. The system of claim 13, wherein said optical system is reflective.

21. The system of claim 13, in which the image produced by said reimaging is directly viewable by an observer at a desired distance from the image.

22. The system of claim 21 in which the lenticular object is generated to provide its reimaged image to be viewed by an observer at said distance.

23. The system of claim 13, in which the image produced by said reimaging is a real image capable of being perceived as floating in three-dimensional space.

24. The system of claim 13, wherein said optical system is refractive.

* * * * *